(12) United States Patent
Shivaram et al.

(10) Patent No.: US 10,223,589 B2
(45) Date of Patent: Mar. 5, 2019

(54) VISION SYSTEM FOR TRAINING AN ASSEMBLY SYSTEM THROUGH VIRTUAL ASSEMBLY OF OBJECTS

(71) Applicant: Cognex Corporation, Natick, MA (US)

(72) Inventors: Guruprasad Shivaram, Wellesley, MA (US); Willard Foster, Newton, MA (US)

(73) Assignee: Cognex Corporation, Natick, MA (US)

(*) Notice: Subject to any disclaimer, the term of this patent is extended or adjusted under 35 U.S.C. 154(b) by 64 days.

(21) Appl. No.: 15/058,118

(22) Filed: Mar. 1, 2016

(65) Prior Publication Data
US 2017/0024613 A1  Jan. 26, 2017

Related U.S. Application Data

(60) Provisional application No. 62/127,808, filed on Mar. 3, 2015.

(51) Int. Cl.
*H04N 7/18* (2006.01)
*G06K 9/00* (2006.01)
(Continued)

(52) U.S. Cl.
CPC ........ *G06K 9/00671* (2013.01); *B25J 9/1697* (2013.01); *G06K 9/3216* (2013.01);
(Continued)

(58) Field of Classification Search
CPC ....... B23K 26/04; G03F 7/70791; G06T 7/85; G06T 7/0004; G06K 9/32
(Continued)

(56) References Cited

U.S. PATENT DOCUMENTS

| 4,841,460 A | 6/1989 | Dewar et al. |
| 4,907,169 A * | 3/1990 | Lovoi ............... B23K 26/04 219/124.34 |

(Continued)

FOREIGN PATENT DOCUMENTS

| CN | 101922917 A | 12/2010 |
| CN | 102540533 A | 7/2012 |

(Continued)

*Primary Examiner* — Gims S Philippe
(74) *Attorney, Agent, or Firm* — Loginov & Associates, PLLC; William A. Loginov

(57) ABSTRACT

This invention provides a system and method for guiding the workpieces to optimal positions to train an assembly system that is generally free of the use of a CMM or similar metrology device. The system and method expresses the image features of the workpieces, when they are in their respective stations, in a common coordinate system. This ability allows a user to visualize the result of assembling the workpieces without actually assembling them, in a "virtual assembly". The virtual assembly assists guiding placement of workpieces in respective stations into a desired relative alignment. The system and method illustratively generates a composite image using the images from cameras used in guiding the workpieces that helps the user visualize how the part would appear following assembly. The user can reposition the images of workpieces in their respective stations until the composite image has a desired appearance.

20 Claims, 15 Drawing Sheets

(51) Int. Cl.
*B25J 9/16* (2006.01)
*G06K 9/32* (2006.01)
*G06T 7/00* (2017.01)

(52) U.S. Cl.
CPC .. *G06T 7/0006* (2013.01); *G05B 2219/31044* (2013.01); *G05B 2219/31066* (2013.01); *G05B 2219/39045* (2013.01); *G05B 2219/40499* (2013.01); *G06T 2207/10004* (2013.01); *G06T 2207/20081* (2013.01); *G06T 2207/20092* (2013.01); *G06T 2207/30164* (2013.01)

(58) Field of Classification Search
USPC ....... 219/124.34; 355/72; 348/187; 382/141, 382/152
See application file for complete search history.

(56) References Cited

U.S. PATENT DOCUMENTS

| | | | |
|---|---|---|---|
| 5,706,416 A | 1/1998 | Mann et al. | |
| 5,748,505 A | 5/1998 | Greer | |
| 5,825,483 A | 10/1998 | Michael et al. | |
| 5,937,083 A | 8/1999 | Ostuni | |
| 5,974,169 A | 10/1999 | Bachelder | |
| 5,978,081 A | 11/1999 | Michael et al. | |
| 6,078,700 A | 6/2000 | Sarachik | |
| 6,175,652 B1 | 1/2001 | Jacobson et al. | |
| 6,323,776 B1 | 11/2001 | Jackson et al. | |
| 6,511,418 B2 | 1/2003 | Shahidi et al. | |
| 6,516,092 B1 | 2/2003 | Bachelder et al. | |
| 6,517,478 B2 | 2/2003 | Khadem | |
| 6,587,601 B1 | 7/2003 | Hsu et al. | |
| 6,678,058 B2 | 1/2004 | Baldwin et al. | |
| 7,181,111 B2 | 2/2007 | Ahrens | |
| 7,336,814 B2 * | 2/2008 | Boca | G06K 9/32 382/141 |
| 7,845,560 B2 | 12/2010 | Emanuel et al. | |
| 2002/0113970 A1 | 8/2002 | Baldwin et al. | |
| 2005/0213807 A1 * | 9/2005 | Wasserman | G06T 7/0004 382/152 |
| 2006/0274302 A1 | 12/2006 | Shylanski et al. | |
| 2010/0132187 A1 | 6/2010 | Nishino et al. | |
| 2011/0157373 A1 * | 6/2011 | Ye | G06T 7/85 348/187 |
| 2011/0157577 A1 * | 6/2011 | Dohse | G03F 7/70791 355/72 |
| 2013/0147944 A1 | 6/2013 | Zhang et al. | |
| 2014/0253720 A1 | 9/2014 | Li et al. | |

FOREIGN PATENT DOCUMENTS

| | | |
|---|---|---|
| CN | 102773524 A | 11/2012 |
| JP | 63257299 A | 10/1988 |
| JP | 05-037195 A | 2/1993 |
| JP | 06-099321 A | 4/1994 |
| JP | 2000162570 A | 6/2000 |
| JP | 2008-014940 A | 1/2008 |
| JP | 2008-036918 A | 2/2008 |
| JP | 2010-541293 A | 12/2010 |
| JP | 2011-029490 A | 2/2011 |
| JP | 5270670 B2 | 8/2013 |
| KR | 20140110722 A | 9/2014 |
| WO | 2005072917 A1 | 8/2005 |
| WO | 2009047214 A2 | 4/2009 |

* cited by examiner

VISION SYSTEM FOR TRAINING AN ASSEMBLY SYSTEM THROUGH VIRTUAL ASSEMBLY OF OBJECTS

RELATED APPLICATION

This application claims the benefit of U.S. Provisional Application Ser. No. 62/127,808, entitled VISION SYSTEM FOR TRAINING AN ASSEMBLY SYSTEM THROUGH VIRTUAL ASSEMBLY OF OBJECTS, filed Mar. 3, 2015, the teachings of which are expressly incorporated herein by reference.

FIELD OF THE INVENTION

This invention relates to machine vision systems, and more particularly to vision systems used to guide the assembly of workpieces and other objects in a manufacturing environment

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks. More particularly, a vision system can be used to inspect a flat workpiece passing through an imaged scene. The scene is typically imaged by one or more vision system cameras that can include internal or external vision system processors that operate associated vision system processes to generate results. One or more of the cameras are calibrated to enable it/them to perform the vision task(s) with sufficient accuracy and reliability. A calibration plate can be employed to calibrate the camera(s), and establish a common (global) coordinate system (also termed a "motion coordinate system") in which the pixel locations of all cameras are mapped to associated points in the coordinate system, thereby allowing an imaged feature in any camera to be located within the coordinate space. Such calibration can be achieved using known "hand-eye" calibration techniques.

A notable application for vision systems is in the assembly of objects (also termed "workpieces") by an automated assembly mechanism that can include moving platforms (motion stages) to accurately support a workpiece at an assembly location and a manipulator (e.g. a robot hand or arm that performs a "pick-and-place" operations or another type of motion device/motion stage) to move another workpiece in an "assembly motion" to an overlying alignment location where it is assembled to the workpiece.

A particular application for a vision system in assembling workpieces involves aligning one planar workpiece with another planar workpiece. For example, a battery can be manipulated by the manipulator over and into a well on a cell phone residing on the motion stage in a pick-and-place operation.

Such vision systems are initially trained so that each workpiece in correct alignment with the other workpiece during runtime operation of the system. During train time, the workpieces are positioned at their respective stations so that, when assembled, the assembled workpieces have a desired mutual positional relationship. Following training, during runtime, the workpieces are repositioned in their respective stations, in order to account for any placement or dimensional variation, and assembled. When the workpiece-assembly process begins, the parts are thereby placed in same mutual positional relationship as they did at train time.

Current training techniques involve placing the workpieces in their respective stations, training the system, assembling them and measuring the assembly error on a separate measuring system such as a coordinate measuring machine (CMM). The measured error is either (a) used to guide the repositioning of the workpieces (by the manipulator and motion stage, respectively) and retraining the assembly system, or (b) on some assembly systems, incorporated as a correction factor that is applied during runtime to correct the position of one or both of the workpieces by their respective mechanism. The disadvantage with training by repositioning of the workpieces is that it is an iterative and time-consuming process. The user has to repeat the training step multiple times until the desired assembly characteristics are achieved. Likewise, the challenge with incorporating a correction factor into the assembly motion of the manipulator and/or motion stage is that there is no established relationship between coordinate frames of the CMM and the assembly system. Therefore, the computation of the correction factor is also an iterative and time-consuming process.

SUMMARY OF THE INVENTION

This invention overcomes disadvantages of the prior art by providing a system and method for guiding the workpieces to optimal positions to train an assembly system that is generally free of the use of a CMM or similar metrology device. The system and method expresses the image features of the workpieces, when they are in their respective stations, in a common coordinate system. This ability allows a user to visualize the result of assembling the workpieces without actually assembling them. This shall be herein termed as "virtual assembly". The system and method employs virtual assembly to help guide placement of the workpieces in their respective stations, such that when assembled, the assembled workpieces will have the desired relative alignment. In one embodiment, the system and method generates a composite image using the images (that can be stitched images constructed from a plurality of acquired images of a workpiece) from cameras used in guiding the workpieces that helps the user visualize how the part would appear following assembly. The user can reposition the images of workpieces in their respective stations until the composite image has a desired appearance. In another embodiment, the user can locate features on the image of the workpieces and express the feature information in the common coordinate system. The user compares the relationship between the features across workpieces to the designed relationship for a correctly assembled part and uses the result to guide the workpieces to positions that assemble optimally. In a third embodiment the workpieces are automatically repositioned to optimal positions using features extracted in the previous embodiment.

By way of example, image features can be mapped from multiple stations to a common coordinate system is through a calibration process. As an example, on systems that use a repeatable pick-and-place manipulator to assemble the parts, a calibration target can be imaged at multiple stations by transferring the target using the manipulator. Appropriate fixtures can be employed to allow the target to be manipulated like a workpiece. In this manner, the calibration target undergoes the same translation as a workpiece, and thus, the coordinates of workpiece features follow the same path from pick station to place station during manipulation as those of the workpiece. Alternatively, the mapping parameters can be computed manually by specifying them, based upon knowledge of the assembly process.

Advantageously, the system and method can enable virtual assembly of an arbitrary number of workpieces from an arbitrary number of stations for the purpose of training an assembly system that assembles these workpieces into a single assembled object.

In an illustrative embodiment, a system and method for virtual assembly of an object an assembly system having at least a first station containing a first workpiece and that is assembled to a second workpiece to the first workpiece in alignment therebetween is provided. One or more vision system cameras and a vision system processor assembly are arranged to image the first workpiece and the second workpiece. The plurality of cameras is calibrated to a common coordinate system. An alignment process generates at least one of images and features of the first workpiece and the second workpiece in the common coordinate system. A manipulation process includes vision tools are arranged to locate a first set of features on the first workpiece and a second set of features on the second workpiece and that automatically align the first set of features with respect to the second set of features. An assembly error computation module computes an assembly error that is dependent on the degree of manipulation of the first workpiece and the second workpiece by the manipulation process during the virtual assembly process. Illustratively, the second workpiece is imaged at a second station remote from the first station.

In embodiments, the vision system cameras image at least a third workpiece. The alignment process generates at least one of images and features of the third workpiece in the common coordinate system. The manipulation process is thus, arranged to allow virtual assembly of the third workpiece with respect to at least one of the first workpiece and the second workpiece so as to align at least one of images and features of the third workpiece with at least one of images and features of at least one of the first workpiece and the second workpiece. The assembly error computation module thereby computes an assembly error that is dependent on the degree of manipulation of the third workpiece with respect to at least one of the first workpiece and the second workpiece. The first workpiece is imaged by the vision system cameras at a first station, and each of the second workpiece and the third workpiece are imaged by the vision system cameras at a second station. Illustratively, at least a fourth workpiece can be imaged by the vision system cameras at a fourth station. In this manner the system and method can be used to train an assembly system that assembles an arbitrary number of workpieces at an arbitrary number of stations.

In embodiments, at least one of the vision system cameras that images the first workpiece and at least one of the vision system cameras that images the second workpiece are subsequently mapped (calibrated) to discrete (separate/different) coordinate systems. Thus, the first workpiece and the second workpiece are assembled with the interface based upon the two discrete coordinate systems. In embodiments at least one of the stations is an assembly platform and at least another of the stations is a pick location. Illustratively, the assembly error can be defined in at least three degrees of freedom. The interface can have a display and user interface for manual alignment of an image of the first workpiece with an image of the second workpiece. The images of at least one of the first workpiece and the second workpiece can be stitched images. The interface can be part of an overall manipulation process or processor, which also includes vision tools, that automatically aligns the first set of features with respect to the second set of features.

Illustratively, at least one vision system camera images at least one of the first workpiece and the second workpiece. That vision system camera (or cameras) is constructed and arranged to acquire images used in a training and/or runtime operation of the assembly system. That camera (or cameras) is separate from (free of) camera(s) used in the alignment process. The assembly platform can define a motion stage and the assembly system can have a repeatable manipulator that moves the second workpiece from the pick station to the motion stage. Also illustratively, at least one of the first workpiece and the second workpiece (and/or third workpiece, fourth workpiece, etc.) defines a planar surface imaged by the vision system cameras.

Illustratively, the system and method can include: (a) a first calibration process that calibrates all the vision system cameras imaging the first station to a first coordinate system, in which all or a subset of the calibrated vision system cameras are adapted for use during runtime operation with the assembly system; (b) a second calibration process that calibrates all the vision system cameras imaging the second station to a second coordinate system, in which all or subset of the calibrated cameras are adapted for use during runtime operation with the assembly system; (c) a third calibration process that ties the first coordinate system and the second coordinate system into the common coordinate system, that employs a different discrete subset of the calibrated vision system cameras to tie the first coordinate system and the second coordinate system into the common coordinate system, and (d) all, or a subset of, the calibrated vision system cameras from (a) and (b) at each of the first station and the second station are employed in virtual assembly based upon the common coordinate system established based upon the first calibration process in (a) and the second calibration process in (b) and the third calibration process in (c).

BRIEF DESCRIPTION OF THE DRAWINGS

The invention description below refers to the accompanying drawings, of which.

DETAILED DESCRIPTION

Figure 1:
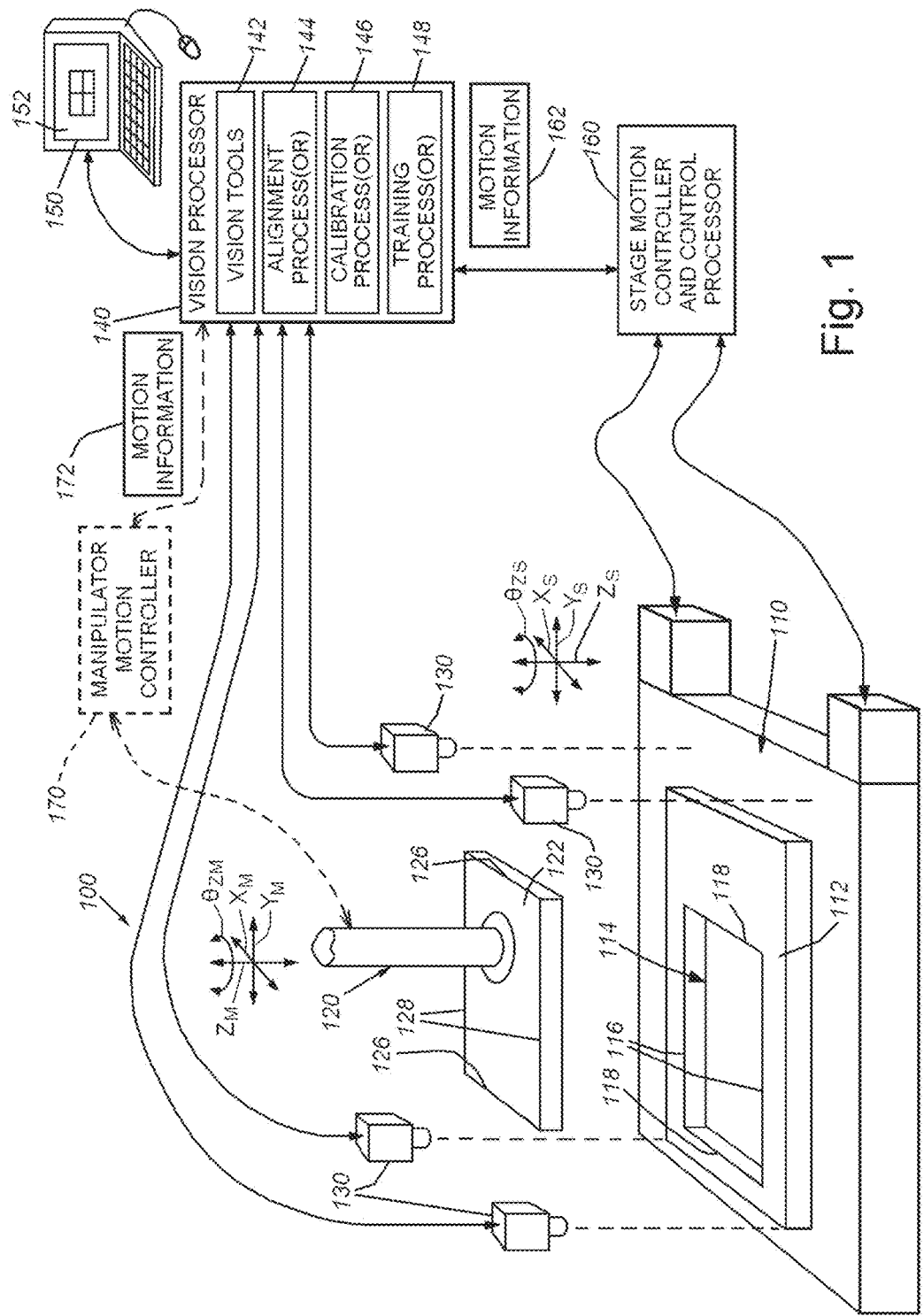
FIG. 1 is a diagram of a multi-camera vision system arranged with respect to an exemplary motion stage used in conjunction with a workpiece assembly system, including, a visual training process(or), according to an illustrative embodiment.

FIG. 1 shows an assembly system 100 that employs a motion stage 110 to movably support a first workpiece 112 in at least three degrees of freedom (e.g. Xs, Ys and $\ominus$zs). The workpiece 112 is generally planar (i.e. flat) along at least a portion thereof with flat plane residing at a specified height along the z-axis Zs of the stage 110. The stage can be defined as an "assembly station", and is imaged by a plurality of cameras 130 that each one images a field of view that is a portion of the overall area occupied by the first workpiece 112. The cameras 130 and their functionality are described further below.

In this arrangement 100, a pick-and-place mechanism or "manipulator" 120 selectively engages and transports a second (planar) workpiece 122 between a source (not shown in this example) and a position overlying the first workpiece 112 as shown. For the purposes of this arrangement, the "pick position" or "pick station" is the position in which the second workpiece 122 is imaged (i.e. overlying the first workpiece) at a different height as shown in FIG. 1. In further embodiments (e.g. as shown in FIGS. 2-5 below), the pick position/station is located at a remote source where the manipulator (e.g. a repeatable pick-and-place mechanism) retrieves a workpiece from the source for assembly on the first workpiece. The assembly task in this example involves the accurate placement of the second workpiece 122 having outer edges 126, 118 into a recess 114 bounded by corresponding inner edges 116, 118 on the first workpiece 112. The manipulator 120 moves along multiple degrees of freedom—for example along axes Xm, Ym and Zm, and a rotation about each axis (e.g. $\ominus$zm about axis Zm). The cameras 130 in this arrangement 100 each image the top plane second workpiece 122, which is at a different height (z axis) than the top plane of the first workpiece 112.

The cameras 130 are each operatively connected to a vision system processor 140 that can be integrated as a custom vision processor circuit within the camera housing, in whole or in part, or can be provided within an interconnected, remote computing device 150, including but not limited to, a PC, laptop, tablet, smartphone, or the like. Note that in assembly systems employing more than one camera, each camera is adapted to send either its acquired image or information extracted from that image to a central processor. The central processor then integrates the information from the various cameras during assembly. Where a remote computing device is employed, such computing device 150 can include a display and associated graphical user interface (GUI) controls, such as a keyboard, mouse and/or touchscreen. The vision processor 140 performs a variety of vision system processes (or elements/modules) including various vision tools 142, such as edge finders, blob analyzers, search tools, caliper tools, etc. Illustratively, the vision processor 140 includes an alignment process(or) that carries out alignment of image data from the two workpieces in a manner described further below. A calibration process(or) 146 facilitates in mapping the image features extracted from the images of the two parts, to a common (or motion) coordinate system using, for example, a calibration plate and hand-eye calibration procedures as described further below. Illustratively, a training process(or) 148 carries out the various training procedures contemplated herein to reposition the workpieces so as to accurately assemble the second workpiece relative to the first workpiece. Note that the vision processor 140 can be established as a plurality of interconnected camera processors (or other devices), or a central processor in a single camera assembly (or remote computing device).

By way of non-limiting example, reference is made to commonly assigned, U.S. Provisional Application Ser. No. 62/201,723, entitled SYSTEM AND METHOD FOR TYING TOGETHER MACHINE VISION COORDINATE SPACES IN A GUIDED ASSEMBLY ENVIRONMENT, filed Aug. 6, 2015. This application, which is incorporated by reference as useful background information, relates to establishing a common coordinate system between remote locations. More particularly, this incorporated application addresses problems that arise from transferring a calibration target by the manipulator (and associated gripper) between pick and place locations, by providing a system and method for calibration that ties the coordinate spaces at the two locations together during calibration time using features on a runtime workpiece. This system and method accommodates at least three different scenarios/techniques—one in which the same features can be imaged and identified at both locations; one in which the imaged features of the runtime workpiece differ at each location (wherein a CAD or measured rendition of the workpiece is available); and one in which the first location containing a motion stage has been calibrated to the motion stage using hand-eye calibration and the second location is hand-eye calibrated to the same motion stage by transferring the runtime part back and forth between locations. Illustratively, the quality of the first two techniques can be improved by running multiple runtime workpieces each with a different pose, extracting the features and accumulating such features at each location; and then using the accumulated features to tie the two coordinate spaces. More generally, the system and method independently calibrates the two locations and ties the coordinate spaces for the two locations together by transferring a workpiece that the manipulator is constructed and arranged/adapted to transfer during assembly and using that workpiece's features instead of using the features of a calibration plate.

In an illustrative embodiment of the incorporated application, a system and method for calibrating a vision system in an environment in which a first workpiece at a first location is transferred by a manipulator to a second location is provided. An operation is performed on the first workpiece, which relies upon tying together coordinate spaces of the first location and the second location. At least one vision system camera is arranged to image the first workpiece when positioned at the first location and to image the first workpiece when positioned at the second location. At least one vision system camera is calibrated with respect to the first location to derive first calibration data which defines a first coordinate space and at least one vision system camera (potentially the same camera(s)) is calibrated with respect to the second location to derive second calibration data which defines a second coordinate space. The features of at least the first workpiece are identified at the first location from a first image of the first workpiece. Based on the identified features in the first image the first workpiece is located with respect to the first coordinate space relative to the first location. The first workpiece is gripped and moved, with the manipulator, at least one time, to a predetermined manipulator position at the second location and a second image of the first workpiece is acquired at the second location. Based upon the identified features in the second image, the first workpiece is located with respect to the second coordinate space relative to the second location. The first coordinate space and the second coordinate space are thereby tied together. Illustratively, where the identified features in the first image are the same as the identified features in the second image, the system and method includes: (a) mapping locations of the identified features in the first image with respect to the first calibration data, (b) mapping locations of the identified features in the second image with respect to the second calibration data, and (c) computing a transform mapping the mapped features at the second location to the mapped features at the first location. Alternatively, where some of the identified features in the first image differ from the identified features in the second image, the system and method includes: (a) mapping locations of the identified features in the first image with respect to the first calibration data, (b) computing a transform relative to a stored specification of feature locations of the first workpiece, (c) mapping locations of the identified features in the second image with respect to the second calibration data, (d) using the transform computed in step (b) to derive locations of the identified features from the second image in the first coordinate space when the workpiece is located at the first location, and (e) computing a transform mapping the mapped features at the second location to the corresponding transformed features at the first location. The specification of the first workpiece can be based upon a CAD model of the first workpiece or a measured model (e.g. CMM-generated measurements) of the first workpiece. Illustratively, the system and method can include: (a) moving the first workpiece iteratively with a motion rendering device at either the first location or the second location to a plurality of different poses, (b) identifying features at each of the poses at each of the first location and the second location and (c) accumulating the identified feature information to enhance accuracy, wherein the first workpiece is either the same workpiece or is one of a plurality of discrete workpieces. In various embodiments, the system and method includes a mapping from an image coordinate system to a calibration coordinate system at the first location, and wherein the mapping is unity. In embodiments, the second location has a second workpiece into which the first workpiece is placed into engagement in a desired alignment with the second workpiece, and/or the second workpiece can be a part, a container or a framework for further processing of the first workpiece. Additionally, in various embodiments, the operation can be at least one of an alignment operation with respect to another object, a printing operation on the first workpiece, and an application operation on the first workpiece, and the operation can be performed at least in part at a location remote from the first location and the second location.

The motion stage 110 includes a motion controller and/or control processor 160 that communicates motion information with respect to the vision processor. This allows the position of the stage 110 to be accurately known and/or tracked by the vision processor. Various encoders and other sensing devices can be used by the stage 110 to generate motion information. A motion controller 170 can also be provided to the manipulator 120 to deliver motion information 172 associated therewith to the vision processor 140.

As described further below, virtual assembly allows the user to employ the cameras and images provided thereby (through the vision system) to virtually assemble the workpieces. In the process of such virtual assembly, the user employs a manipulation process(or) that obtains assembly error information that can be later used in an operation to accommodate the movement of the physical assembly mechanism, which, thereafter, typically perform a (typically) repeatable set of physical assembly steps, which is modified by the assembly error correction. In illustrative embodiments, the motion stage is employed to minimize assembly error based on data derived from virtual assembly by applying appropriate adjustments. Alternatively, other motion devices can accommodate assembly error correction/adjustment.

While the assembly system is typically arranged as a highly repeatable mechanism, it is expressly contemplated that an assembly system in which variations to motion can be programmed or input during runtime (or is in other ways non-repeatable) can be trained using the virtual assembly and virtual assembly procedures shown and described herein).

Note also that the physical workpiece assembly arrangement depicted in various embodiments herein contains an arbitrary number of cameras (e.g. one or four) that image various regions of the motion stage. The number of cameras at each station used in virtual assembly is highly variable in alternate arrangements. Likewise, the number of stations within the overall system is highly variable. In this embodiment a single station is imaged with two workpieces at differing heights. As described further in the embodiment of FIGS. 2-4 below, one or more cameras are respectively positioned to image two discrete work stations—a pick workstation and a place workstation. Each of these cameras is calibrated to the common coordinate system.

According to further embodiments, it is also expressly contemplated that more than two stations with one or more associated cameras can be provided in the overall virtual assembly and virtual assembly arrangement. For example, an additional pick station or an intermediate assembly station can be provided. All cameras employed in virtual assembly can be calibrated to a common coordinate system (established based on the motion stage or another coordinate system) and the images from each stations' camera(s) can be part of the virtual assembly and virtual assembly process described herein.

Figure 2:
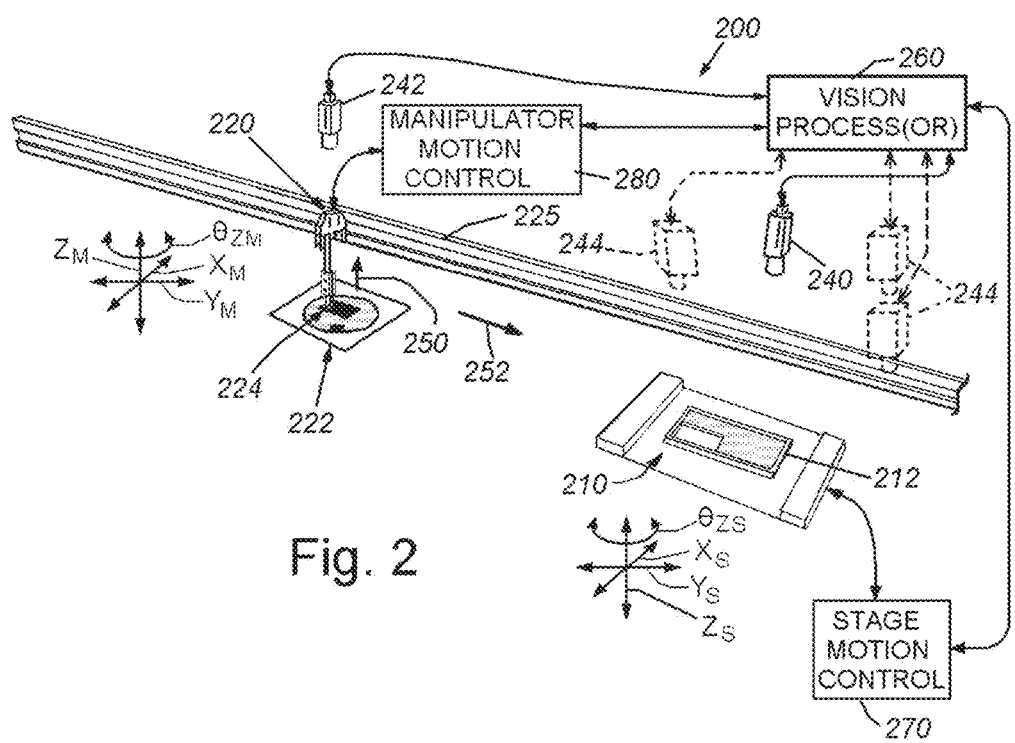
FIG. 2 is a diagram of a two-camera vision system arranged with respect to an exemplary pick-and-place assembly arrangement, in which a workpiece is in alignment with another workpiece, showing the pick-and-place manipulator located at the pick station to extract a workpiece.
Figure 3:
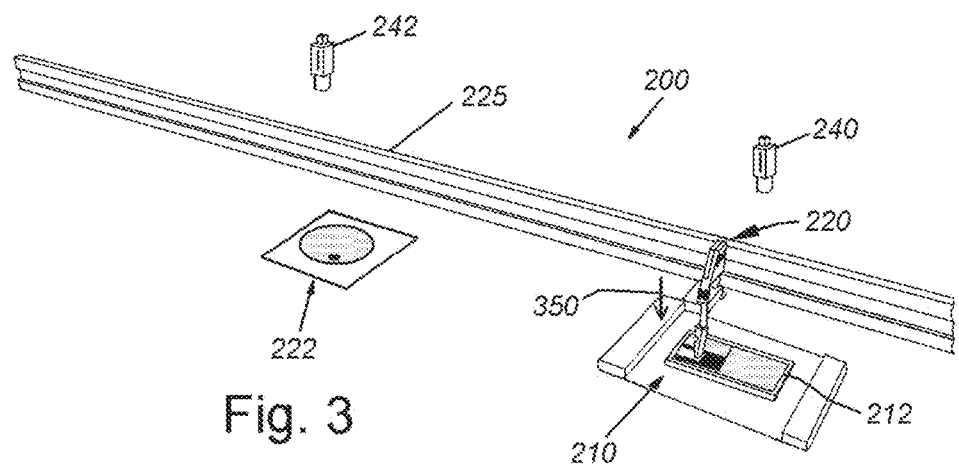
FIG. 3 is a diagram of the two-camera vision system and the exemplary pick-and-place assembly arrangement of FIG. 2, showing the pick-and-place manipulator located at the place station to assemble the workpieces together in relative alignment.

FIG. 2 particularly illustrates an alternate arrangement 200 of a motion stage 210 and pick-and-place (manipulator) mechanism 220 that can employ the system and method according to an embodiment. The pick station 222 includes a second workpiece 224 that is selectively picked up (arrow 250) by the manipulator 220 and directed (arrow 252) along a rail 225 to the motion stage 210, which defines a place station in this embodiment. A first workpiece 212 is adapted to receive the second workpiece 224 during assembly in an appropriate alignment therebetween, and as described generally above. The stage 210 moves along two or more degrees of freedom (e.g. axes Xs, Ys, rotation ⊖zs), and resides at a height along the axis Zs. The manipulator 220 moves along at least the axis Ym, and along a pick/place direction in the axis Zm. Rotation ⊖zm about the axis Zm is also contemplated. A combination of motions by the stage 210 and manipulator 220 is sufficient to align the second workpiece 224 with respect to the first workpiece 212 during a place operation (arrow 350), which is shown in FIG. 3.

In this arrangement 200, at least one camera 240, 242 respectively images each station (210, 222). The cameras 240, 242 are interconnected to a vision process(or) 260 that is arranged as described above. One or both stations can include additional cameras 244 (shown in phantom at the stage 210). The vision process(or) 260 is also operatively interconnected to a stage motion controller 270 and a manipulator motion controller 280 that provide motion information in manner described above.

Figure 4:
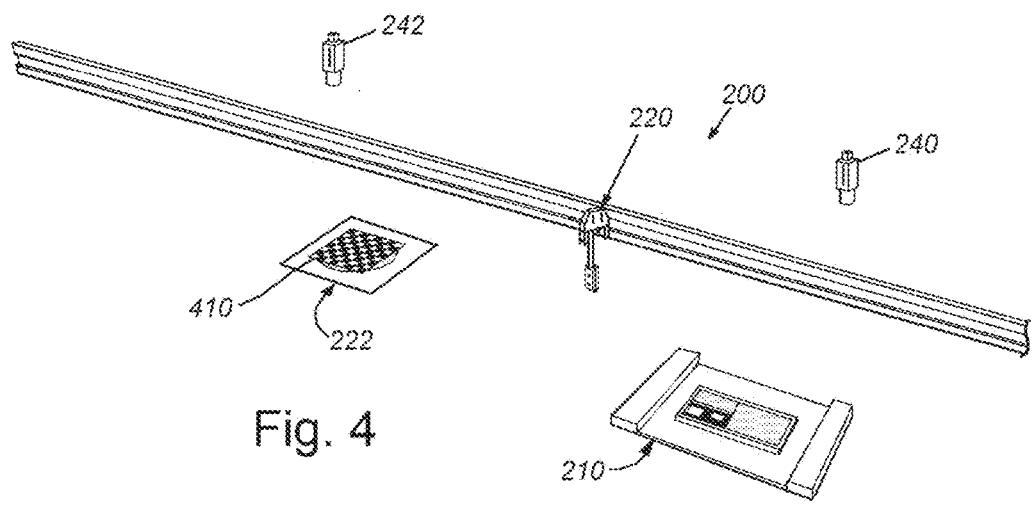
FIG. 4 is a diagram of the two-camera vision system and the exemplary pick-and-place assembly arrangement of FIG. 2, showing the a calibration plate located in the field of view of the pick station camera for calibration thereof with respect to a global coordinate system.
Figure 5:
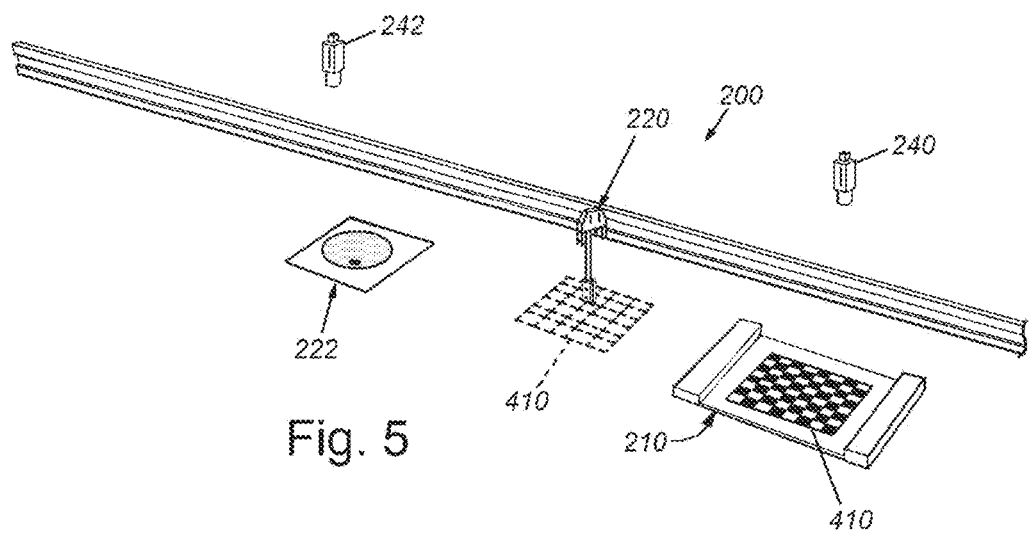
FIG. 5 is a diagram of the two-camera vision system and the exemplary pick-and-place assembly arrangement of FIG. 2, showing the a calibration plate located in the field of view of the place station camera for calibration thereof with respect to a global coordinate system.

Reference is now made to FIGS. 4 and 5, which show an automated technique to map features from the two cameras to a common coordinate system. The technique involves the calibration of the pick station camera 242 and place station camera, respectively and a procedure 600 for calibration of multiple camera assemblies at a plurality of stations. Initially, the procedure 600 performs (in step 610) a hand-eye calibration of the camera(s) 240, 244 on the stage 210 (or cameras 130 on stage 110 in FIG. 1) so that all cameras define a common or motion coordinate system.

Note as used herein the term "all" cameras refers to all cameras that are used by the system in the virtual assembly herein. It is expressly contemplated that some cameras used by the vision system (or other processes) can be omitted from the task. It is contemplated mainly that at least one camera from each station is calibrated to the common coordinate system and generates images used in the training process.

By way of further background on a general understanding of certain calibration principles, for a rigid body, such as a calibration target or "plate", a motion can be characterized by a pair of poses: a starting pose immediately preceding a motion, and an ending pose immediately following the motion—a "pose" herein being defined as a set of numerical values to describe the state of a body, at any one particular instant in time, in some underlying coordinate system—a virtual characterization of the body. For example, in two dimensions, a rigid body can be characterized by three numbers: a translation in X, a translation in Y, and a rotation R. A pose in the context of a calibration plate describes how the calibration plate is presented to the camera(s), when there is relative motion between the camera(s) and the calibration plate. Typically, in a standard so-called "hand-eye calibration", a calibration plate is presented at a number of different poses to the camera(s), and each camera acquires an image of the calibration plate at each such pose. For vision system hand-eye calibration, the calibration plate is typically moved to a plurality of predetermined poses at which cameras acquire respective images of the plate. The goal of such hand-eye calibration is to determine the rigid body poses of the camera(s) and calibration plate in the "motion coordinate system". The motion coordinate system can be defined in a variety of ways. The numbers in the poses (that specify where the calibration plate and/or cameras reside in the space) should be interpreted in an appropriate coordinate system. Once a single common coordinate system is selected, the poses and motion are described/ interpreted in that common/global coordinate system. This selected coordinate system is often termed the "motion coordinate system." Typically "motion" is provided by a physical device that can render physical motion, such as a robot arm, or a motion stage, such as a gantry. Note that either the plate can move relative to one or more stationary camera(s) or the camera(s) can move relative to a stationary plate. The controller of such a motion-rendering device employs numerical values (i.e. poses) to command the devices to render any desired motion, and those values are interpreted in a native coordinate system for that device. Note, although any motion coordinate system can be selected to provide a common, global coordinate system relative to the motion-rendering device and camera(s), it is often desirable to select the motion-rendering device's native coordinate system as the overall motion coordinate system.

Hand-eye calibration, thus, calibrates the system to a single motion coordinate system by rendering of motions (either moving the calibration plate or moving the cameras), and acquiring images before and after that motion to determine the effects of such motion on a moving object.

Referring again to FIGS. 4-6, the next step 620 in the procedure 600 entails placement of the calibration target/ plate 410 at one of the stations—e.g. the pick station 222 (or while being held by the manipulator 120)—at which position, the camera(s) 242 acquire one or more images of the target 410. This information is stored in the vision process (or) 260 (or 140). In step 630, the target 410 is then transferred to the other station (i.e. the motion stage 210 (or 110). One or more images of the target 410 are then acquired at the stage in step 640 by the camera(s) 240, 244 (or 130). In step 650 of the procedure 600, the pixel locations of all cameras 240, 242, 244 (or 130) are then mapped to the calibration target coordinates based on found edges in the target 410 using the images of step 640. Then, in step 660, the mapping of the calibration plate coordinates to the motion stage coordinate system is computed using the images of the calibration target at the stage that were acquired in step 640. In step 670 the pixel locations of the cameras at the platform are mapped to the coordinate system of the motion stage 210 (or 110).

It is to be noted that 610, 660 and 670 are optional. For the purpose of this invention one can stop at 650 because one will have attained the ability to map pixels from all the cameras in the assembly system to the calibration plate coordinate system. The advantage of performing 660 and 670 is that it helps in generating a composite image whose X and Y axes are largely aligned to the X and Y axes of the motion stage enabling easier manipulation of the composite image by controlling the motors.

Having mapped the camera pixel locations to a common coordinate system, the vision system can be placed in training mode with this information and used to virtually align images of workpieces to each other.

Figure 7:
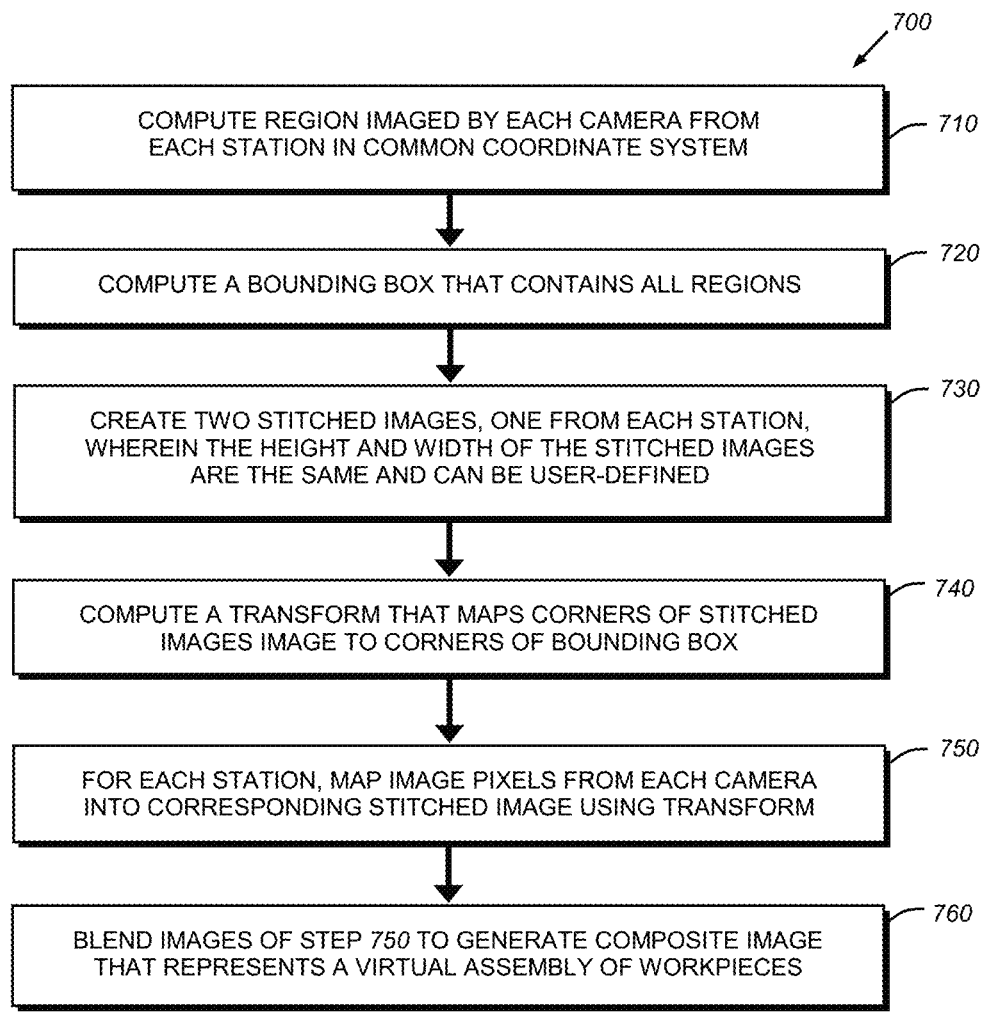
FIG. 7 is a flow diagram of a procedure for generating stitched images of workpieces at each station, and generating a composite image using the stitched images.

Reference is now made to FIG. 7, which shows a procedure 700 for generating stitched and composite images of workpieces in each station. In step 710, the procedure 700 computes a region imaged by each camera from each station in the common coordinate system that was determined above. In step 720, a bounding box is computed that contains all the regions. In step 730, the procedure 700 creates two stitched images, one for each station. Illustratively the height and width of the stitched images are each the same, and can be user defined.

As used herein, the term "stitched image" or "stitching" relates to a process that combines two or more source images into one composite result image. The process is useful when a camera field of view is too small to capture the entire desired scene and multiple images are required. There are various techniques available to those of skill in the generation of stitched images. The vision system can, for example, include a stitching tool, such as the Cognex Image Stitching tool available from Cognex Corporation of Natick, Mass. This tool operates in a computing space that is common to all of the source images and to the result image. Each source image contains a unique calibration transform that maps its image into this common space. Conceptually, the Image Stitching tool builds the result in the common space, and the resulting stitched image contains a transform that maps the common space result into the stitched image. Such stitched images can form the basis of a "composite image", which is herein defined as the result of a compositing process where features from different images are combined to generate a single image. The composite image is made available by the GUI of the virtual assembly system so that a user or an automated process can manipulate workpiece(s) to generate a virtual assembly of workpieces used to train the system.

Figure 8:
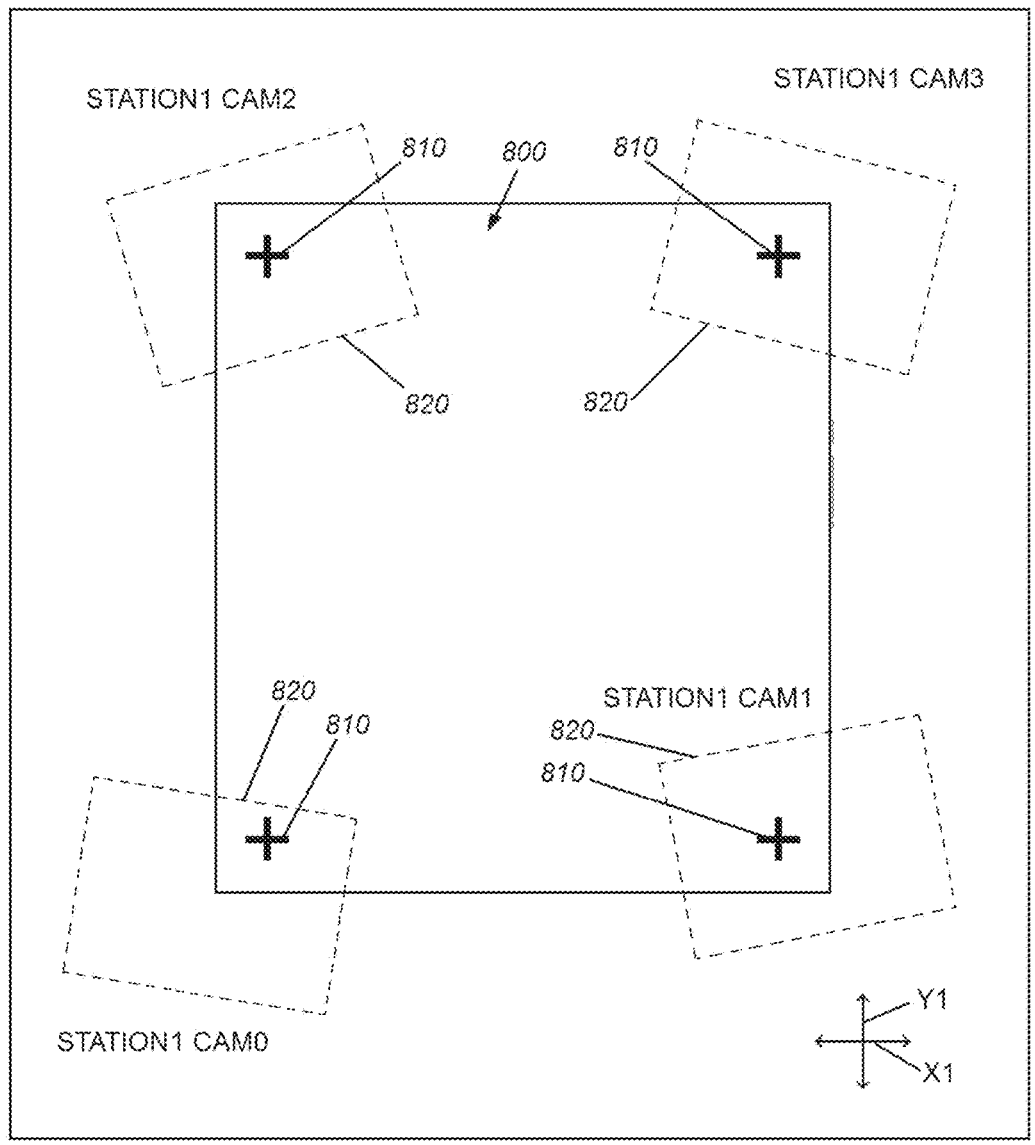
FIG. 8 is a diagram showing a four-camera system generating a first stitched image with four exemplary cross features (fiducials) on a first workpiece at a first station.
Figure 9:
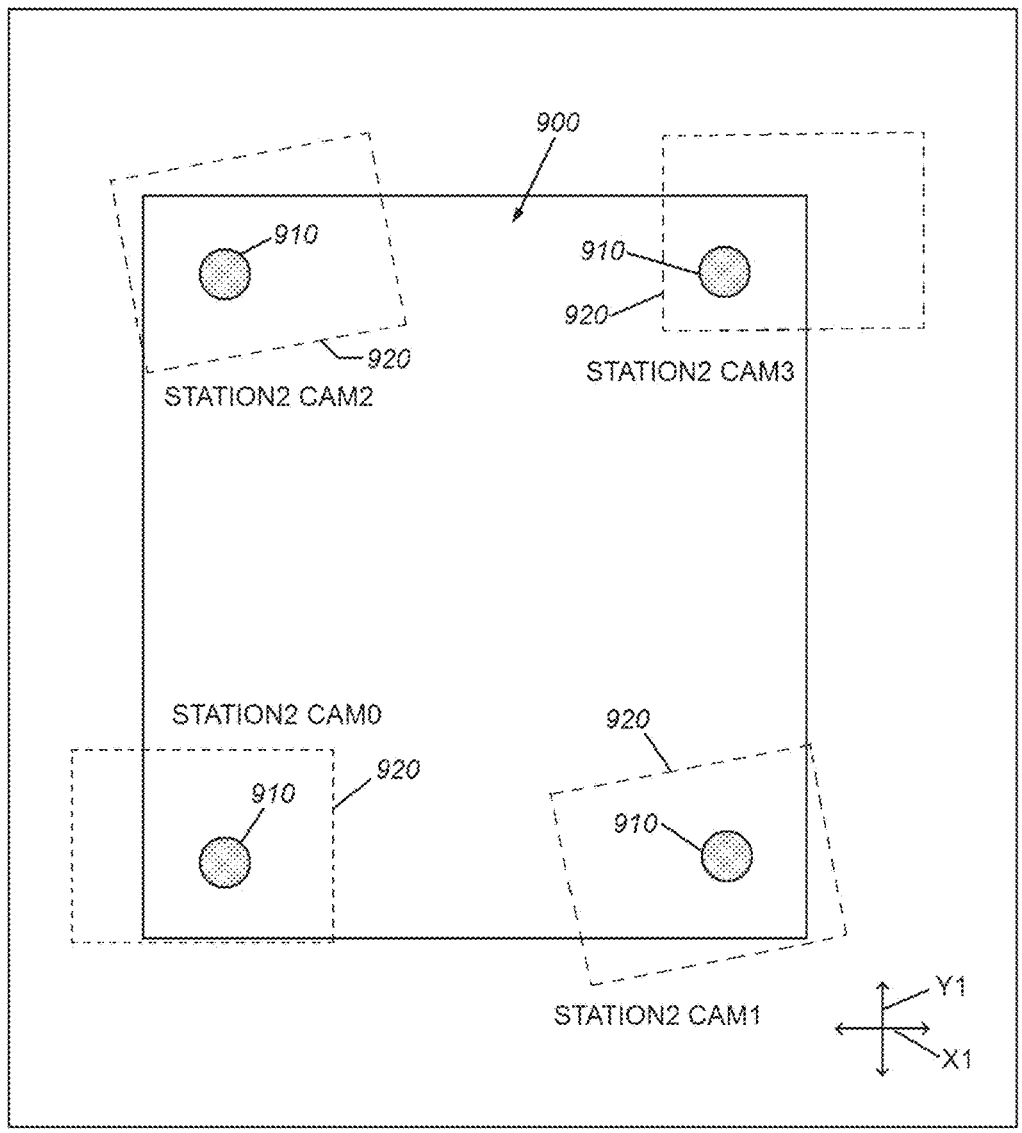
FIG. 9 is a diagram showing a four-camera system generating a second stitched image with four exemplary circle features (fiducials) on a second workpiece at a second station.

In the example of FIG. 8, the first workpiece 800 containing four fiducials/features (crosses 810 in this example) is imaged in a first station by four exemplary cameras with fields of view shown as dashed boxes 820. Note that the fields of view 820 of each of the four cameras have arbitrary orientation in the stitched image because no care was taken to physically align the cameras to the common coordinate system (X1, Y1). Likewise, in the example of FIG. 9, the second workpiece 900 containing four fiducials/features (circles 910 in this example) is imaged in a second station by four exemplary cameras with fields of view shown as dashed boxes 920. Note that the fields of view 920 of each of the four cameras again have arbitrary orientation in the stitched image because no care was taken to physically align the cameras to the common coordinate system (X1, Y1).

Figure 6:
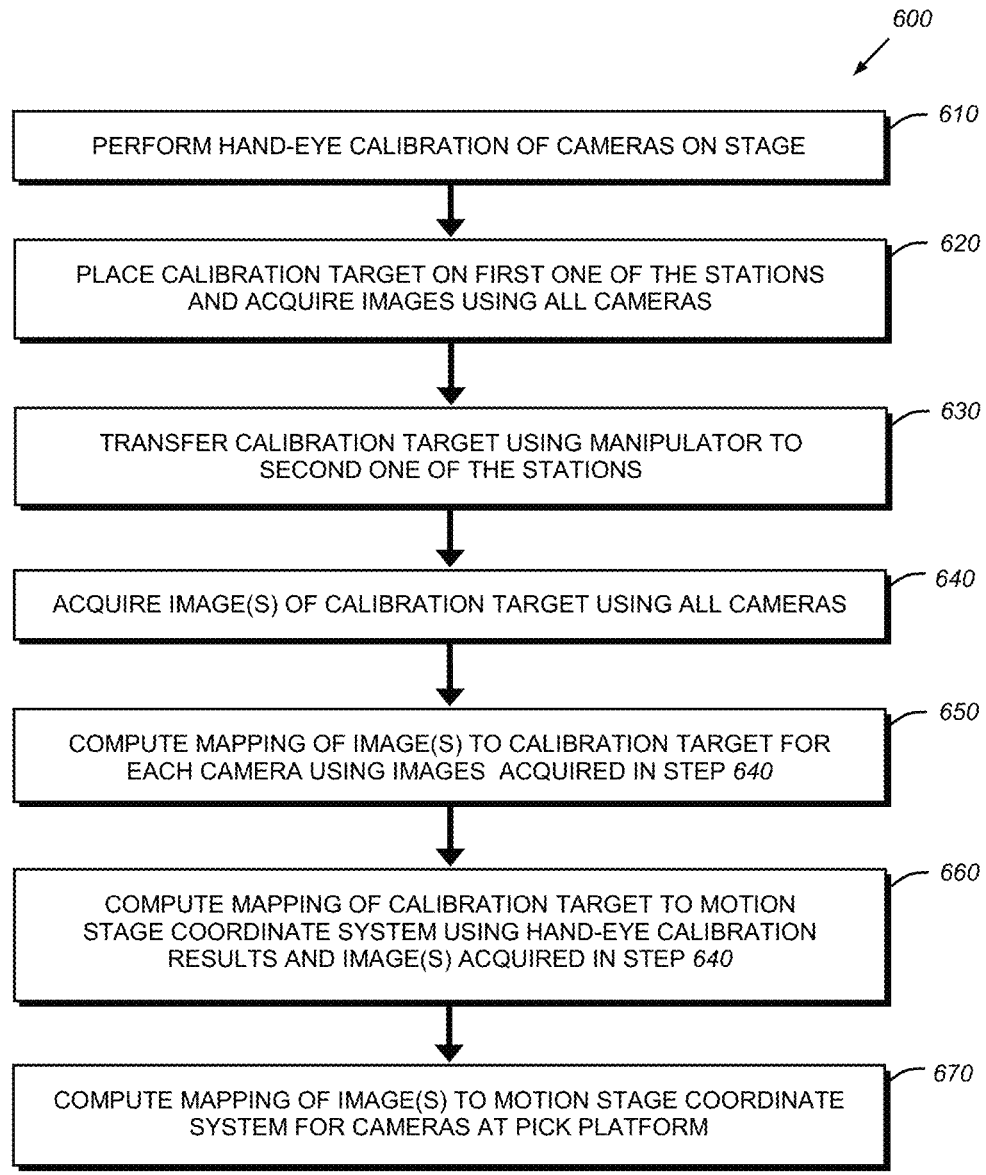
FIG. 6 is a flow diagram of a procedure for calibrating multiple cameras in the assembly system to a common coordinate system.

In the procedure 700, a transform maps the corners of the stitched image to the corners of the bounding box in step 740. Then, in step 750, for each station, the procedure 700 maps the image pixels from each camera into the corresponding stitched image using the transform. Next, in step 760, the procedure composes the stitched images from step 750 by, for example, averaging the two images, to generate the resultant composite image. The composite image represents a virtual assembly and can be used to infer the quality of assembly. Note that these steps are exemplary of a variety of procedures and techniques for generating stitched and composite images following calibration (FIG. 6). These procedures typically employ the ability to map feature positions in an image to a common coordinate system.

Figure 10:
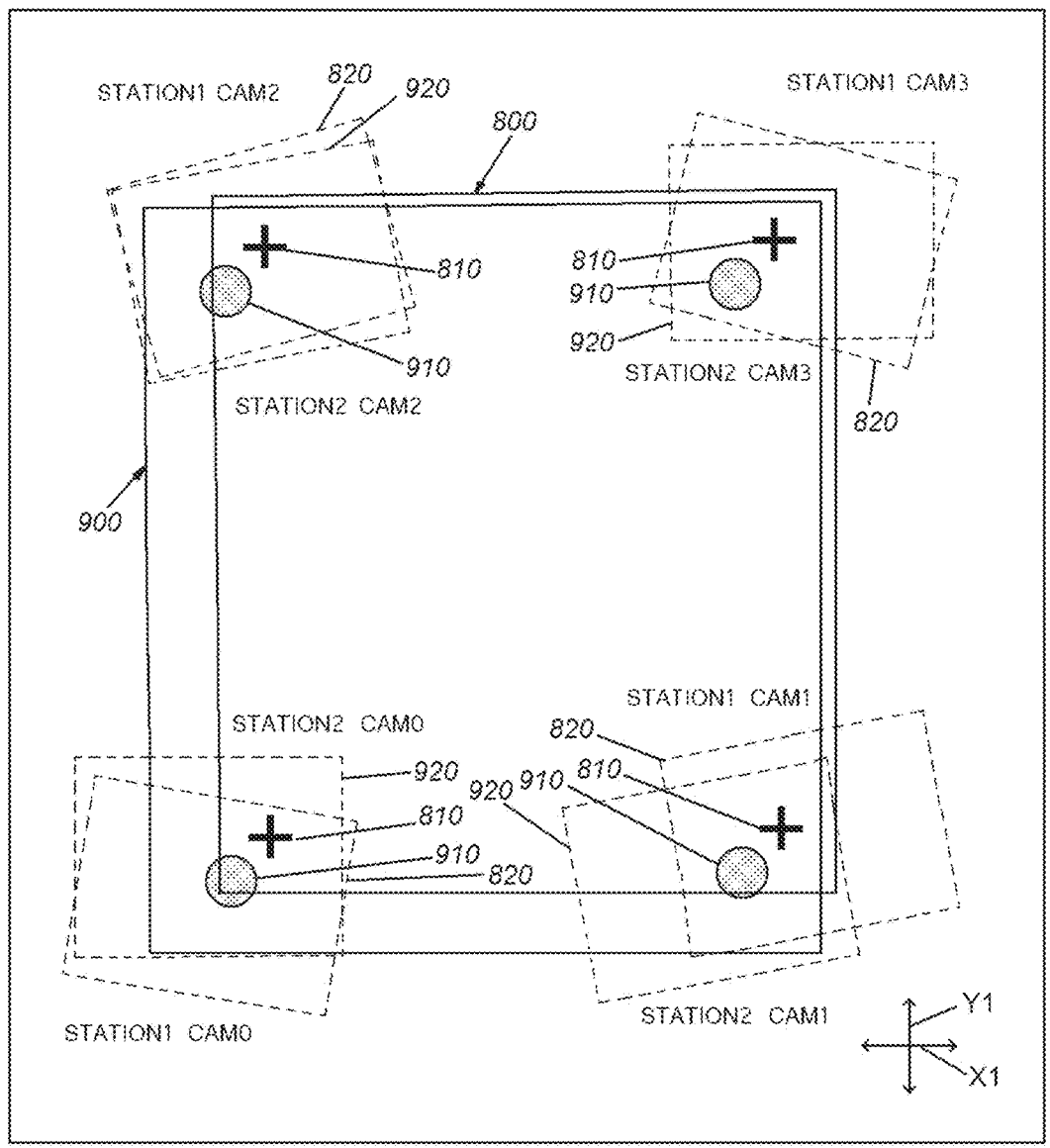
FIG. 10 is a diagram showing a composite image with the first stitched image of FIG. 8 and the second stitched image of FIG. 9 with respective fiducials misaligned.
Figure 11:
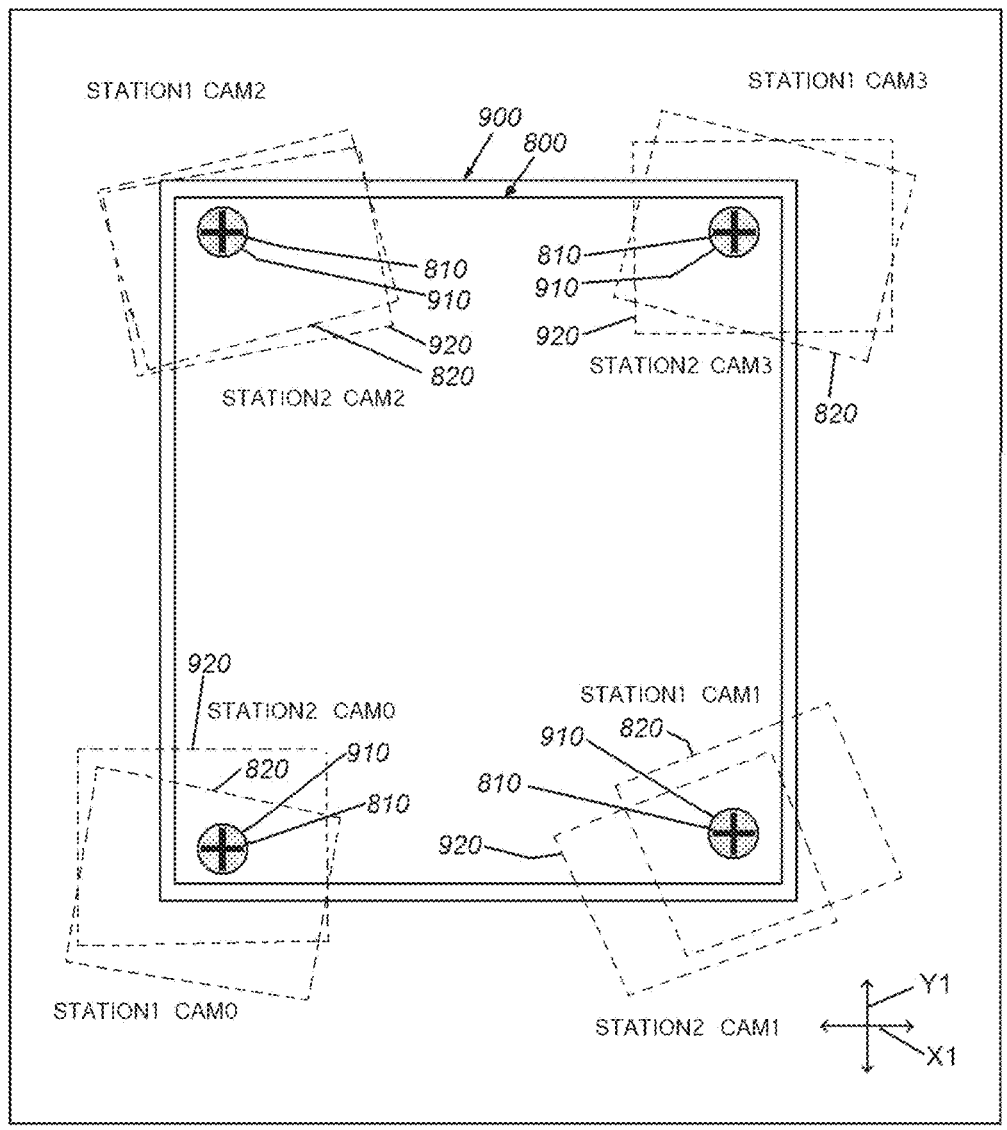
FIG. 11 is a diagram showing a composite image with the first stitched image of FIG. 8 and the second stitched image of FIG. 9 with respective fiducials aligned.

FIG. 10 illustrates an exemplary view of the workpieces 800 and 900 in a non-aligned orientation in a composite image that is generated by averaging the stitched images from the two stations. Note that the respective fiducials 810 and 910 are off center from each other. Conversely, when aligned as shown in FIG. 11, the composite image depicts aligned workpieces in which the fiducials of the similarly sized stitched images moved into alignment with each other.

Figure 12:
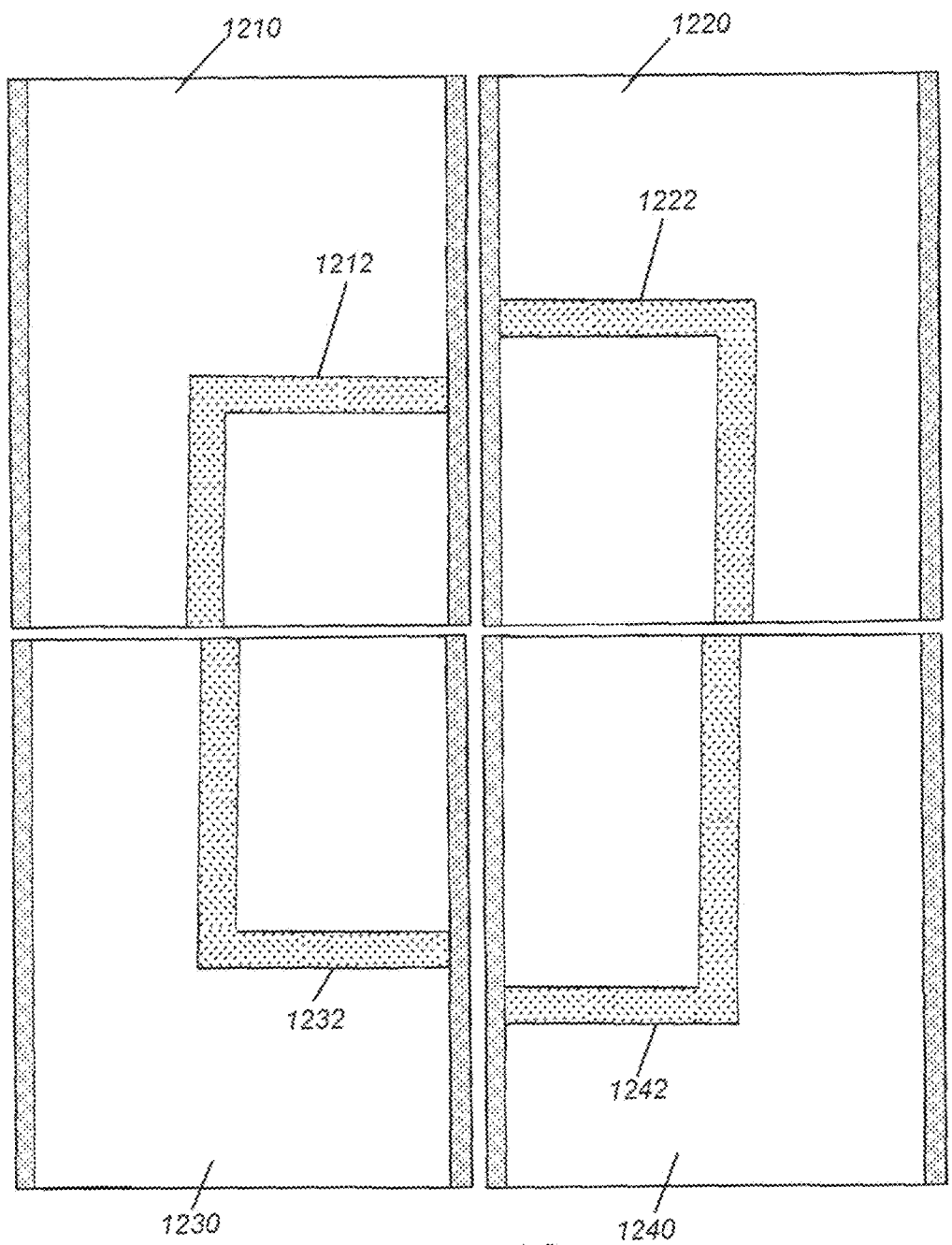
FIG. 12 is a diagram of a graphical user interface (GUI) display viewed by a user in which a multi-camera (e.g. four-camera) arrangement images edges of a workpiece placed on a platform.
Figure 13:
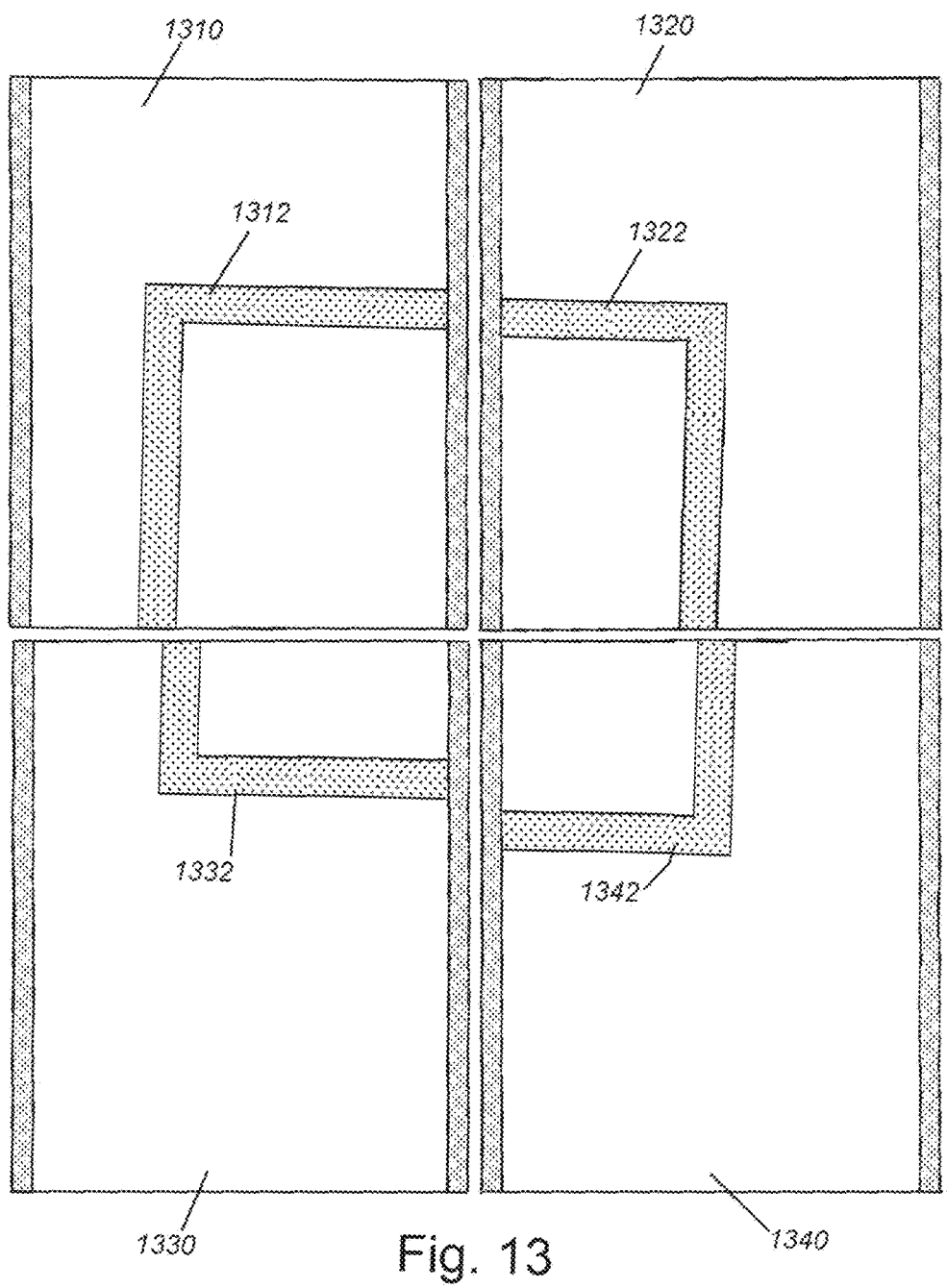
FIG. 13 is a diagram of a graphical user interface (GUI) display viewed by a user in which the multi-camera arrangement images edges of a workpiece placed on a motion stage.

A graphical user interface (GUI) display with similar depictions is shown in FIGS. 12-15. In FIG. 12, a four-camera arrangement generates four respective images 1210, 1220, 1230 and 1240 of the first workpiece placed on (e.g.) a pick platform. Note that the respective edge 1212, 1222, 1232 and 1242 of the workpiece is scaled differently in each image due to the physical placement of the respective camera relative to the platform and workpiece. FIG. 13 is a GUI display viewed by a user in which the four-camera arrangement generates four respective images 1310, 1320, 1330 and 1340 of the second workpiece placed on (e.g.) the motion stage. Again, the respective edges 1312, 1322, 1332 and 1342 are scaled differently based on the positioning of the cameras.

Figure 14:
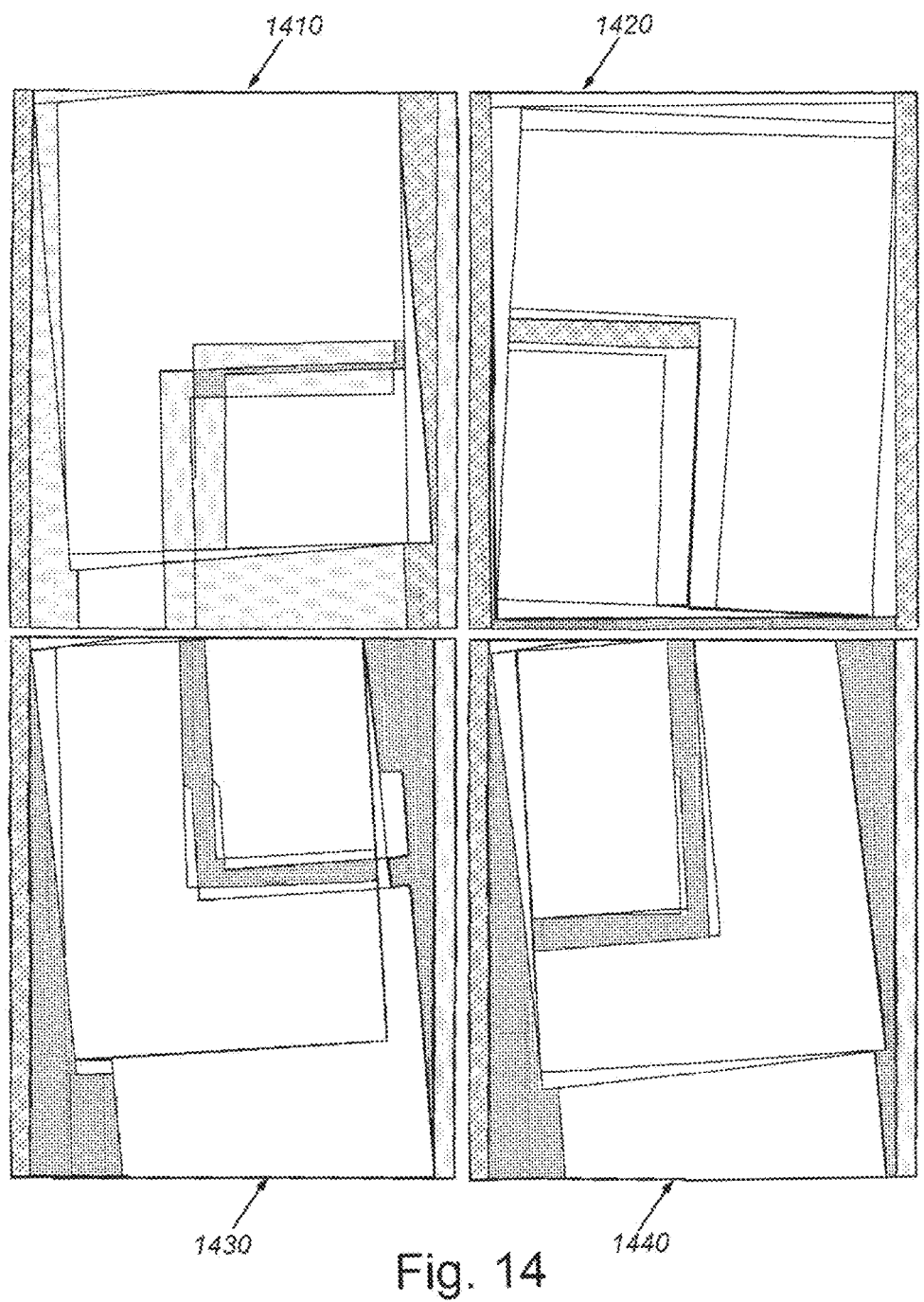
FIG. 14 is a diagram of a graphical user interface (GUI) display viewed by a user in which the multi-camera arrangement, in which the GUI displays four images that are regions within a composite image when the workpieces are at located positions that result in a misaligned assembly.
Figure 15:
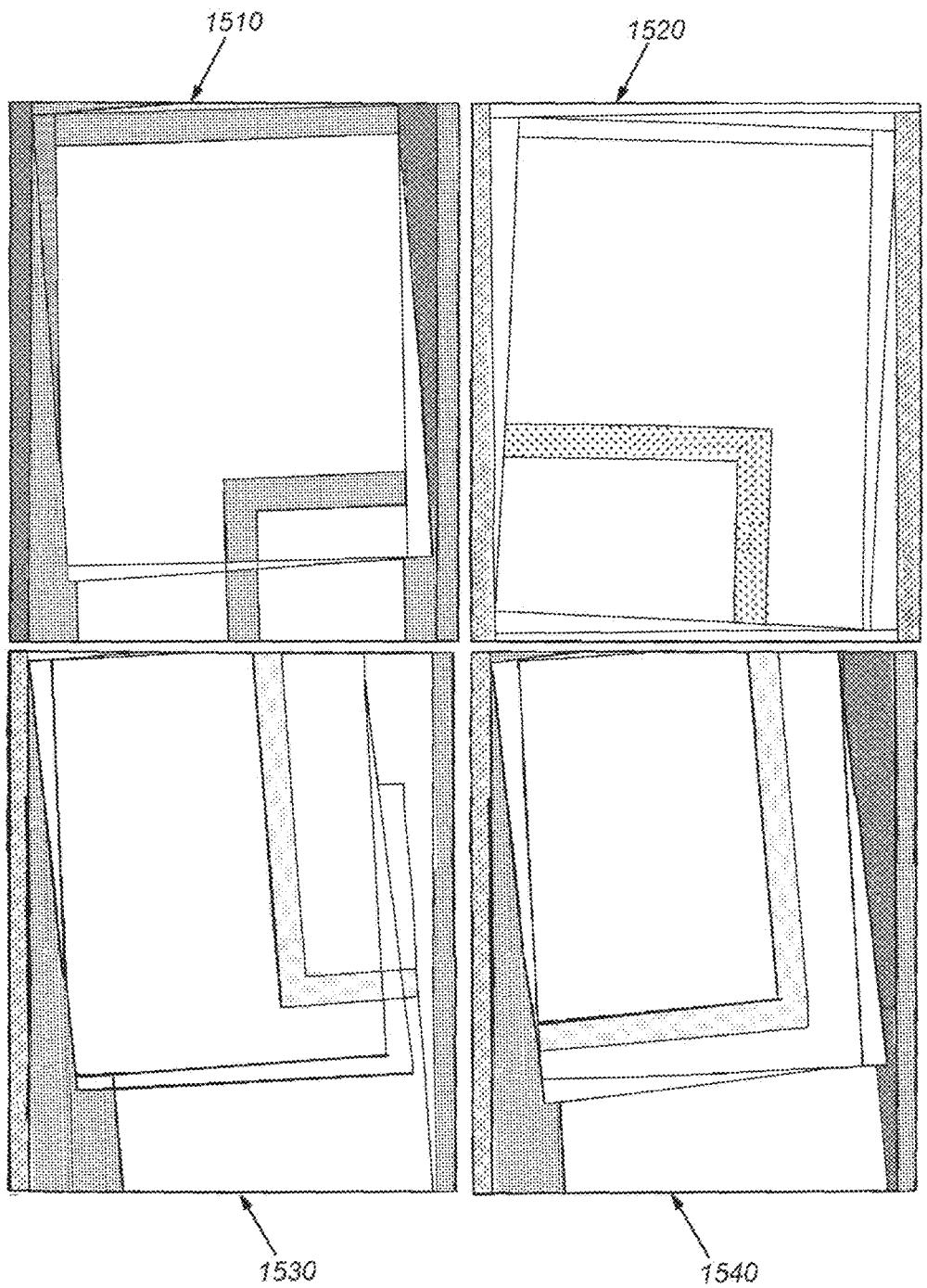
FIG. 15 is a diagram of a graphical user interface (GUI) display viewed by a user in which the multi-camera arrangement, in which the GUI displays four images that are regions within a composite image when the workpieces are at positions that result in a aligned assembly.

In FIG. 14, a GUI display is shown in which the four images 1410, 1420, 1430 and 1440 are regions within a composite image when the workpieces are at positions that result in a misaligned assembly. Note that the edges in each image are skewed. Conversely, in FIG. 15 the four displayed images 1510, 1520, 1530 and 1540 are regions within a composite image when the workpieces are at positions that result in a aligned assembly. Note that the edges overlap in each image.

Note that while the depicted GUI contains four images, corresponding to four cameras, it is expressly contemplated that fewer images can be displayed relative to a given number of cameras imaging the station/scene. For example, certain images can be omitted where redundant and/or limited/no useful image information is provided. Thus, a composite image containing two or three images in the depicted display viewing pane can be provided. It is contemplated mainly that sufficient feature information on each workpiece be presented in the composite image of the display to enable a user (or automated process) to align those workpieces in the virtual assembly process.

It is expressly contemplated that a variety of techniques can be used to generate the above-described stitched and composite images. In general, such techniques employ the ability to map the pixels from each image to a common coordinate system. Moreover, the above-depicted composite images average the stitched images. The composite images can be defined by alternate representations, and hence can be generated using other techniques. For assembly systems that use one camera at each station, the stitching procedure can be omitted, and compositing of images can be performed directly by the process. Notably, the stitching procedure employs images from multiple cameras at a station to create a single image for the workpiece at the station. In various embodiments the stitching and compositing operations can be combined as a single vision task.

In general, the system and method takes advantage of the fact that the features on the workpieces, when they are in their respective stations, to be expressed in a common (global or motion) coordinate system. There are at least three techniques in which the feedback is provided to help place the workpieces at a desired orientation (e.g. the "pose"

defined by x and y translation and ϴ rotation) during training. These are as follows:

1. Visual Alignment

Figure 16:
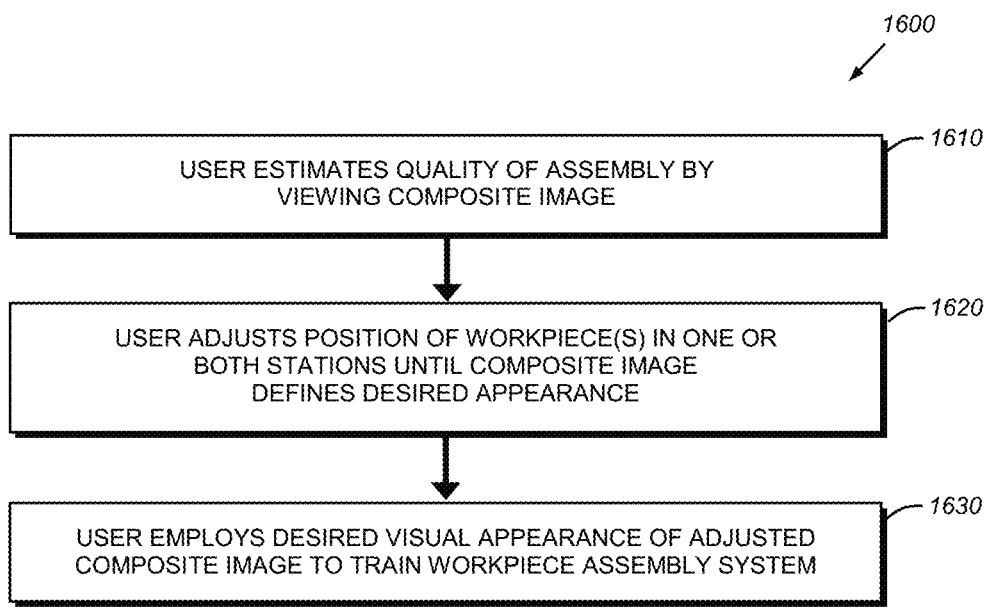
FIG. 16 is a flow diagram of a procedure for training an assembly system based on visual workpiece alignment using virtual assembly.

This technique can be used for assembly systems that have overlapping fields of view in the common coordinate system (e.g. the arrangement 100 of FIG. 1). A stitched image is generated at each station using all of the cameras at the station. The stitched image can be generated because for any pixel in any given camera, the position in the common coordinate system is known. Once the stitched images are generated, a composite image is generated by the process by compositing the stitched images at the two stations (for example, by averaging the stitched images). Again, this is possible because it is possible to express any pixel at any station in a common coordinate system. This, in effect, virtually assembles the two workpieces, which helps the user to readily visualize what an assembled part would look like. That is, the user translates and rotates at least one of the two images of respective workpieces (for example, the workpiece on the motion stage) either manually or using controls provided by the graphical user interface (GUI). These can include a mouse, touchscreen and/or data-entry boxes. The user continues the translation/rotating process until the workpieces are in an appropriate alignment to represents an assembled object in a desired configuration and associated appearance. The resulting object containing two workpieces is, thus, "virtually" assembled. During virtual assembly, the user can zoom into some salient features on the composite images and move the motion stages at the stations until the desired assembly is achieved. Once this is done the user can train the assembly system. With reference to the procedure 1600 of FIG. 16, visual alignment by the user, in summary, entails: estimating quality of the assembly by viewing the assembled image (step 1610); adjusting the position of the workpiece(s) in one or both stations until a composite image defines the desired appearance (step 1620); and employing the desired visual appearance of the adjusted composite image to train the workpiece assembly system (step 1630).

2. Alignment by Computing Feature Relationships on the Workpieces

This technique can be used for assembly systems that have overlapping or non-overlapping fields of view in the common coordinate system. In this technique the user can employ vision tools that locate at least one feature on each workpiece, and compute the geometric relationship between them in the common coordinate system. For example, the workpiece(s) can include fiducials as described above, and fiducial finders can be employed to locate the position and orientation of such. The user can then reposition one or more of the workpieces until the geometric relationship between the features in the virtually assembled part matches the relationship in the design documents for the assembled part. Such movement can be accomplished either by manually repositioning the work pieces in at least one of the pick and place positions or by controlling the motion stages. In an exemplary embodiment, the user can locate two point features on one workpiece and three point features on the second workpiece. The virtual assembly system can be designed to take pairs of features, one on each workpiece, and measure the distance between them and provide a feedback to the user. The user can reposition the workpieces until the distance between them is the same as that for a correctly assembled part.

Figure 17:
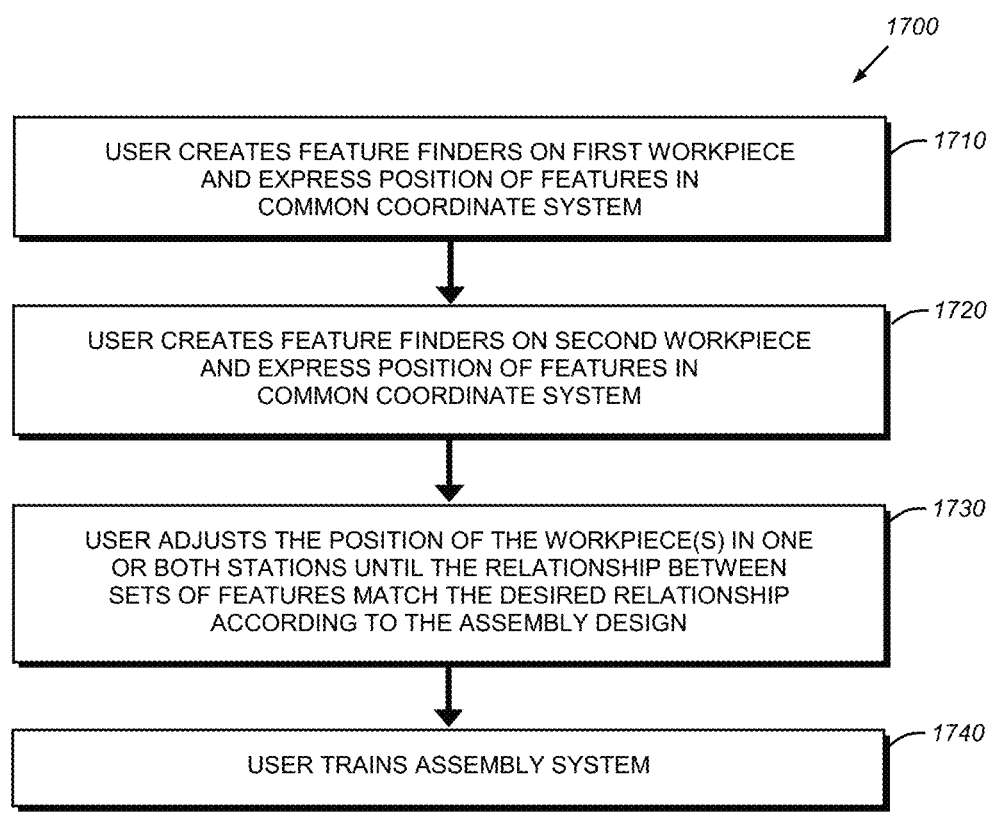
FIG. 17 is a flow diagram of a procedure for virtual assembly of workpieces using feature relationships.

Reference is made to the procedure 1700 of FIG. 17. In step 1710, the user creates features finders that can locate features on first workpiece and express the position the user finds in the common coordinate system. In step 1720, the user creates feature finders that can locate features on the second workpiece and express the position they find in the common coordinate system. The user does this by using vision tools in the vision process(or) and associated GUI. Then, in step 1730, the user adjusts the position of the workpieces in one or both stations until the relationship between sets of features match the desired design relationship. The feature finders can be used designed to locate features on any of the images (original images, stitched images or composite images). More generally, the user trains the assembly system, as shown in step 1740.

3. Automated Guidance

Alternatively or additionally, automated guidance can be used to guide the workpieces to the desired position for training. In the example above, the user can be asked to enter the desired distance between pairs of points following assembly. Once the user enters the correction values the assembly system can move the parts by moving the motion mechanisms (e.g. manipulators motion stages, etc.) until the desired geometric relationship in the virtually assembled part is achieved. This can be particularly accomplished using an appropriate interface that translates the error correction factors into a registered motion in the linear drive motors of the stage. For example, in the case of a XXY stage, X and Y inputs translate along orthogonal axes and a differential XY input generates rotation about the Z-axis (allowing motion in three degrees of freedom). Error correction values can be directly transmitted by the interface from the virtual assembly system once a final assembly configuration is determined by the system.

Generally, using any of the above training techniques generates a mapped set of motion error correction values that are stored with respect to the motion controller for the motion stage, the manipulator, or both. These values are used to modify the motion so that workpieces are appropriately aligned by the repeatable elements of the assembly system.

In further embodiments, it is expressly contemplated that the virtual system can be adapted to assemble an arbitrary number of workpieces at an arbitrary number of stations. For example, the virtual assembly system can be used in conjunction with a physical system that assembles exemplary workpieces WA, WB1, WB2, WC into a single assembled object—where WA is imaged at station A, WB1 and WB2 are imaged at station B and WC is imaged at station C. The user can virtually assemble all workpieces into the complete, assembled object, and the assembly error at each station/stage of assembly is computed to train the physical system.

In further embodiments, groups of vision system cameras can be established for virtual assembly so that each group includes at least one camera from each station, and all are mapped to the common coordinate system. Following the initial grouping, the groups can be separately calibrated so that each group maps features to a different, discrete coordinate system. The images from these groups are then used to perform virtual assembly of the entire object. Moreover, a set of vision system cameras used for virtual assembly may or may not be the same as the set of cameras that is used to train and run the physical assembly system.

It should be clear that the above-described system and method allows a user to more easily account for motion errors in an assembly system in a manner that avoids the trial and error in using physical movements of workpieces. This system and method also avoids the use of a CMM or similar metrology device that adds time and cost to the setup and training process.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as the acting direction of gravity. Accordingly, this description is meant to be taken only by way of example, and not to otherwise limit the scope of this invention.

What is claimed is:

1. A system for virtual assembly of an object in an assembly system having at least a first station containing a first workpiece, the assembly system assembling a second workpiece to the first workpiece in alignment therebetween, the system comprising:
    one or more vision system cameras and a vision system processor assembly arranged to image the first workpiece and the second workpiece, the plurality of cameras being calibrated to a common coordinate system;
    an alignment process that generates at least one of images and features of the first workpiece and the second workpiece in the common coordinate system;
    a manipulation process, having vision tools that locate a first set of features on the first workpiece and a second set of features on the second workpiece, that automatically aligns the first set of features with respect to the second set of features so as to align at least one of images and features of the first workpiece and the second workpiece; and
    an assembly error computation module that computes an assembly error based on a degree of manipulation of the first workpiece and the second workpiece by the manipulation process during the virtual assembly process.

2. The system as set forth in claim 1 wherein the second workpiece is imaged at a second station remote from the first station.

3. The system as set forth in claim 2 further comprising at least a third workpiece, the vision system cameras imaging the third workpiece, the alignment process generating at least one of images and features of the third workpiece in the common coordinate system, the manipulation process being arranged to allow manipulation of the third workpiece with respect to at least one of the first workpiece and the second workpiece so as to align at least one of images and features of the third workpiece with at least one of images and features of at least one of the first workpiece and the second workpiece, and wherein the assembly error computation module computes an assembly error based on a degree of manipulation of the third workpiece with respect to at least one of the first workpiece and the second workpiece.

4. The system as set forth in claim 3 wherein the first workpiece is imaged by the vision system cameras at a first station and each of the second workpiece and the third workpiece are imaged by the vision system cameras at a second station.

5. The system as set forth in claim 4 further comprising at least a fourth workpiece imaged by the vision system cameras at a fourth station.

6. The system as set forth in claim 2 further comprising;
    (a) a first calibration process that calibrates all the vision system cameras imaging the first station to a first coordinate system, in which all or a subset of the calibrated vision system cameras are adapted for use during runtime operation with the assembly system,
    (b) a second calibration process that calibrates all the vision system cameras imaging the second station to a second coordinate system, in which all or subset of the calibrated cameras are adapted for use during runtime operation with the assembly system,
    (c) a third calibration process that ties the first coordinate system and the second coordinate system into the common coordinate system, that employs a different discrete subset of the calibrated vision system cameras to tie the first coordinate system and the second coordinate system into the common coordinate system, and
    (d) wherein all, or a subset of, the calibrated vision system cameras from step (a) and step (b) at each of the first station and the second station are employed in virtual assembly based upon the common coordinate system established based upon the first calibration process in step (a) and the second calibration process in step (b) and the third calibration process in step (c).

7. The system as set forth in claim 2 wherein one of the first station and the second station is an assembly platform and another of the first station and the second station is a pick location.

8. The system as set forth in claim 7 wherein the assembly platform defines a motion stage and the assembly system has a repeatable manipulator that moves the second workpiece from the pick station to the motion stage.

9. The system as set forth in claim 1 wherein the assembly error is defined in at least three degrees of freedom.

10. The system as set forth in claim 1, further comprising a display and user interface for manual alignment of at least one image of the first workpiece and at least one image of the second workpiece.

11. The system as set forth in claim 1 further comprising at least one vision system camera images at least one of the first workpiece and the second workpiece, the at least one vision system camera being constructed and arranged to acquire images used in at least one of training and runtime operation of the assembly system and being free of use with respect to the alignment process.

12. The system as set forth in claim 1 manipulation process employs at least one of (a) images of the first workpiece that are stitched and (b) images of the second workpiece that are stitched.

13. The system as set forth in claim 12 wherein the images of the first workpiece and the second workpiece are composed into a composite image with respect to the interface.

14. The system as set forth in claim 1 wherein at least one of the first workpiece and the second workpiece defines a planar surface imaged by the vision system cameras.

15. A method for virtual assembly of an object using an assembly system having at least a first station containing a first workpiece, the assembly system assembling a second workpiece to the first workpiece in alignment therebetween, the method comprising the steps of:
   acquiring an image, with one or more vision system cameras and a vision system processor assembly, of the first workpiece and the second workpiece, the plurality of cameras being calibrated to a common coordinate system;
   generating at least one of images and features of the first workpiece and the second workpiece in the common coordinate system;
   automatically manipulating the second workpiece with respect to the first workpiece so as to align at least one of images and features of the first workpiece and the second workpiece; and
   computing an assembly error based on a degree of manipulation of the first workpiece and the second workpiece during the virtual assembly process.

16. The method as set forth in claim 15 wherein the step of acquiring an image comprises acquiring an image of the second workpiece at a second station remote from the first station.

17. The method as set forth in claim 16 wherein one of the first station and the second station is an assembly platform and another of the first station and the second station is a pick location.

18. The method as set forth in claim 15 wherein the assembly error is defined in at least three degrees of freedom.

19. The method as set forth in claim 15, further comprising employing a display and user interface for manual alignment of at least one image of the first workpiece and at least one image of the second workpiece.

20. A system for virtual assembly of an object in an assembly system having at least a first station containing a first workpiece, the assembly system assembling a second workpiece to the first workpiece in alignment therebetween, the system comprising:
   one or more vision system cameras and a vision system processor assembly arranged to image the first workpiece and the second workpiece, the plurality of cameras being calibrated to a common coordinate system, wherein the second workpiece is imaged at a second station remote from the first station;
   an alignment process that generates at least one of images and features of the first workpiece and the second workpiece in the common coordinate system;
   a manipulation process, having vision tools that locate a first set of features on the first workpiece and a second set of features on the second workpiece, that automatically aligns the first set of features with respect to the second set of features so as to align at least one of images and features of the first workpiece and the second workpiece; and
   an assembly error computation module that computes an assembly error based on a degree of manipulation of the first workpiece and the second workpiece by the manipulation process during the virtual assembly process; and
   at least a third workpiece, the vision system cameras imaging the third workpiece, the alignment process generating at least one of images and features of the third workpiece in the common coordinate system, the manipulation process being arranged to allow manipulation of the third workpiece with respect to at least one of the first workpiece and the second workpiece so as to align at least one of images and features of the third workpiece with at least one of images and features of at least one of the first workpiece and the second workpiece, and wherein the assembly error computation module computes an assembly error based on a degree of manipulation of the third workpiece with respect to at least one of the first workpiece and the second workpiece.

* * * * *